United States Patent
Hamel et al.

(10) Patent No.: US 11,987,368 B2
(45) Date of Patent: May 21, 2024

(54) AIRCRAFT OPERATION DURING STEEP APPROACH

(71) Applicants: BOMBARDIER INC., Dorval (CA); C SERIES AIRCRAFT LIMITED PARTNERSHIP, Mirabel (CA)

(72) Inventors: Remi Hamel, Laval (CA); Olivier Lebegue, Outremont (CA); Valerie Desilets, Vaudreuil-Dorion (CA); Jean Brousseau, Pierrefonds (CA); Sigit Afrianto, Pierrefonds (CA); Andrew J. Byrne, Deux-Montagnes (CA); Eric Hodge, Laval (CA)

(73) Assignees: BOMBARDER INC., Dorval (CA); AIRBUS CANADA LIMITED PARTNERSHIP, Mirabel (CA)

( * ) Notice: Subject to any disclaimer, the term of this patent is extended or adjusted under 35 U.S.C. 154(b) by 1179 days.

(21) Appl. No.: 16/624,937

(22) PCT Filed: Jun. 29, 2017

(86) PCT No.: PCT/IB2017/053936
§ 371 (c)(1),
(2) Date: Dec. 20, 2019

(87) PCT Pub. No.: WO2019/002919
PCT Pub. Date: Jan. 3, 2019

(65) Prior Publication Data
US 2020/0130851 A1 Apr. 30, 2020

(51) Int. Cl.
*B64D 15/16* (2006.01)
*B64D 13/02* (2006.01)
(Continued)

(52) U.S. Cl.
CPC ........... *B64D 15/166* (2013.01); *B64D 13/02* (2013.01); *B64D 13/06* (2013.01); *B64D 15/20* (2013.01);
(Continued)

(58) Field of Classification Search
CPC ................ B64D 13/06; B64D 15/20
See application file for complete search history.

(56) References Cited

U.S. PATENT DOCUMENTS

| 5,111,402 A | 5/1992 | Brooks et al. |
| 9,026,275 B1 * | 5/2015 | Young .................... G08G 5/003 |
| | | 701/122 |

(Continued)

FOREIGN PATENT DOCUMENTS

| EP | 3135883 A1 * | 3/2017 | .............. F02C 7/042 |
| EP | 3135883 A1 | 3/2019 | |

OTHER PUBLICATIONS

International Searching Authority, Notification of Transmittal of the International Search Report and the Written Opinion, re: International Application No. PCT/IB2017/053936PCT, dated Nov. 10, 2017.

(Continued)

*Primary Examiner* — Khoi H Tran
*Assistant Examiner* — Tristan J Greiner
(74) *Attorney, Agent, or Firm* — Norton Rose Fulbright Canada LLP

(57) ABSTRACT

Systems and methods to facilitate a steep final approach phase of flight of an aircraft are disclosed. In one embodiment, a method for operating an aircraft during a steep approach phase of flight of the aircraft comprises operating an engine of the aircraft at an idle speed associated with the steep approach type that is lower than an idle speed associated with a non-steep approach type capable of being (Continued)

executed by the aircraft. The method also comprises operating an ice protection system of the aircraft during the steep approach phase of flight of the aircraft.

14 Claims, 5 Drawing Sheets

(51) Int. Cl.
    *B64D 13/06*     (2006.01)
    *B64D 15/20*     (2006.01)
    *B64D 37/32*     (2006.01)
    *G05D 1/00*     (2006.01)

(52) U.S. Cl.
    CPC ........... *B64D 37/32* (2013.01); *G05D 1/0676* (2013.01); *B64D 2013/0603* (2013.01)

(56) References Cited

U.S. PATENT DOCUMENTS

| | | | |
|---|---|---|---|
| 2006/0162371 A1* | 7/2006 | Lui | B64D 13/06 62/402 |
| 2009/0043434 A1* | 2/2009 | Deker | G08G 5/025 701/16 |
| 2009/0314897 A1 | 12/2009 | Boissenin et al. | |
| 2011/0062288 A1* | 3/2011 | Cremers | B64D 13/06 244/135 R |
| 2013/0187007 A1* | 7/2013 | Mackin | F02C 9/18 60/785 |
| 2013/0327014 A1 | 12/2013 | Moulebhar | |
| 2014/0013951 A1* | 1/2014 | Schaeffer | B01D 53/227 96/10 |
| 2015/0108233 A1* | 4/2015 | Wright | B64D 13/08 237/81 |
| 2015/0113999 A1* | 4/2015 | Tretow | F02C 7/18 137/15.1 |
| 2015/0275758 A1* | 10/2015 | Foutch | F02C 7/047 60/785 |

OTHER PUBLICATIONS

Embraer S.A., Embraer 190 Jet Certified For Operating at London City Airport, Internet Archive, WaybackMachine, www.embraer.com.br/web/, Feb. 2, 2010, Embraer S.A., USA, accessed on Jun. 29, 2017.
Kate Sarsfiled, Falcon 8X Approved for London City Airport, May 3, 2017, Flight Global, www.flightglobal.com/news . . . , accessed on Jun. 29, 2017.
airliners.net, Why Did Airbus Offer "Steep Approach" Option?, http://www.airliners.net/forum . . . , accessed on Jun. 29, 2017.
Government of Canada, Advisory Circular (AC), Approval of Steep Approach Landing Capability of Transport Category Aeroplanes, May 4, 2015, http://www.tc.gc.ca/eng/civilaviation . . . , accessed on Jun. 29, 2017.
Bombardier, Transport Canada and EASA Award Steep Approach Certifications to Bombardier CS100 Aircraft, Apr. 26, 2017, Canada, http://commercialaircraft.bombardier.com . . . , accessed on Jun. 29, 2017.
airliners.net, Steep Approach: Which A/C Are Capable?, http://www.airliners.net . . . , accessed on Jun. 29, 2017.
Embraer Executive Jets, Embraer Executive Jets Phenom 300 Receives Steep-Approach Certification from EASA, May 19, 2014, http://embraerexecutivejets.com . . . , accessed on Jun. 29, 2017.
Embraer Executive Jets, Embraer's Lineage 1000E | Ultra-Large Corporate Jet Competitive Advantages, http://www.embraerexecutive.jets.com . . . , accessed on Jun. 29, 2017.
Embraer Executive Jets, The Journey to London City Airport—Legacy 500 Steep-Approach Capability Certification, www.embraerexecutive.jets.com . . . , accessed on Jun. 29, 2017.
airliners.net, Ground Idle vs Flight Idle, http://www.airliners.net . . . , accessed on Jun. 29, 2017.
Bombardier Global 6000, Steep Approaches with Published Glidepath Angles From 4.5 to 5.5 Degrees, Airplane Flight Manual, CSP 700-1V, Rev. 15, Aug. 6, 2015.
Andreas Linke-Diesinger, Systems of Commercial Turbofan Engines, An Introduction to Systems Functions, 2008, pp. 90-93, Springer, Germany.

\* cited by examiner

AIRCRAFT OPERATION DURING STEEP APPROACH

CROSS REFERENCE TO RELATED APPLICATION

This application is a national phase application under 35 U.S.C. 371 of International Patent Application No. PCT/IB2017/053936 filed on Jun. 29, 2017.

TECHNICAL FIELD

The disclosure relates generally to aircraft, and more particularly to a steep approach flight phase of aircraft.

BACKGROUND OF THE ART

Classic (i.e., non-steep) approach angles for aircraft are typically in the order of about 3 degrees. However, certain airports located in urban areas can impose approach procedures that require steeper approach angles for noise reduction or due to the presence of obstacles such as buildings or towers for example. Steeper approach angles can also be required for landing at airports located near mountainous terrain. Steep approach procedures can be different from approach procedures carried out at classic approach angles and can require different control and performance considerations for some aircraft.

SUMMARY

In one aspect, the disclosure describes a method for operating an aircraft during a steep approach phase of flight of the aircraft. The method comprises: operating an engine of the aircraft at a first idle speed associated with a first approach type during the steep approach phase of flight of the aircraft, the first approach type being steeper than a second approach type capable of being executed by the aircraft, the first idle speed being lower than a second idle speed associated with the second approach type capable of being executed by the aircraft; and operating an ice protection system of the aircraft during the steep approach phase of flight of the aircraft.

In some embodiments, the method comprises supplying pressurized air extracted from the engine to the ice protection system of the aircraft during the steep approach phase of flight of the aircraft.

In some embodiments, the method comprises receiving a signal indicative of the first approach type to be executed by the aircraft and then reducing an amount of pressurized air being supplied from the engine to one or more pneumatic loads other than the ice protection system.

In some embodiments, the one or more pneumatic loads other than the ice protection system include an environmental control system of the aircraft that is operable in a lower-flow mode of operation and a higher-flow mode of operation and the method comprises inhibiting an operation of the environmental control system in the higher-flow mode of operation during the steep approach phase of flight of the aircraft.

In some embodiments, the aircraft comprises at least two engines and the pressurized air supplied to the ice protection system during the steep approach phase of flight of the aircraft is supplied from all engines.

In some embodiments, the method comprises inhibiting the operation of the engine of the aircraft at the first idle speed in case of a condition causing the pressurized air to be supplied to the ice protection system from fewer than the at least two engines.

In some embodiments, the aircraft comprises at least two engines and the method comprises inhibiting an operation of the ice protection system where pressurized air is supplied to the ice protection system from only one of the at least two engines during the steep approach phase of flight of the aircraft.

In some embodiments, the method comprises inhibiting a supply of pressurized air extracted from the engine to a fuel tank inerting system of the aircraft during the steep approach phase of flight of the aircraft.

In some embodiments, the method comprises inhibiting a supply of pressurized air extracted from the engine to a heating system for a cargo compartment of the aircraft during the steep approach phase of flight of the aircraft.

In some embodiments, an angle of approach associated with the first approach type is equal to or greater than 4.5 degrees from horizontal.

Embodiments can include combinations of the above features.

In another aspect, the disclosure describes a system for operating an aircraft during a steep approach phase of flight of the aircraft. The system comprises:
one or more data processors; and
non-transitory machine-readable memory storing instructions executable by the one or more data processors and configured to cause the one or more data processors to:
after receiving a signal indicative of a first approach type to be executed by the aircraft where the first approach type is steeper than a second approach type capable of being executed by the aircraft, command an engine of the aircraft to operate at a first idle speed associated with the first approach type during the steep approach phase of flight of the aircraft, the first idle speed being lower than a second idle speed associated with the second approach type capable of being executed by the aircraft; and
command an ice protection system of the aircraft to operate during the steep approach phase of flight of the aircraft.

In some embodiments, the instructions are configured to cause the one or more data processors to command a supply of pressurized air extracted from the engine to the ice protection system of the aircraft during the steep approach phase of flight of the aircraft.

In some embodiments, the instructions are configured to, after receiving the signal indicative of the first approach type to be executed by the aircraft, cause the one or more data processors to command a reduction in an amount of pressurized air being supplied from the engine to one or more pneumatic loads other than the ice protection system.

In some embodiments,
the one or more pneumatic loads include an environmental control system of the aircraft that is operable in a lower-flow mode of operation and a higher-flow mode of operation; and
the instructions are configured to cause the one or more data processors to command an inhibition of an operation of the environmental control system in the higher-flow mode of operation during the steep approach phase of flight of the aircraft.

In some embodiments, the instructions are configured to cause the one or more data processors to command the supply pressurized air to the ice protection system from at least two engines of the aircraft during the steep approach phase of flight of the aircraft.

In some embodiments, the instructions are configured to cause the one or more data processors to command a inhibition of the operation of the engine of the aircraft at the first idle speed in case of a condition causing the pressurized air to be supplied to the ice protection system from fewer than the at least two engines.

In some embodiments, the instructions are configured to cause the one or more data processors to inhibit an operation of the ice protection system where pressurized air is supplied to the ice protection system from only one of at least two engines of the aircraft during the steep approach phase of flight of the aircraft.

In some embodiments, the instructions are configured to cause the one or more data processors to inhibit a supply of pressurized air extracted from the engine to a fuel tank inerting system of the aircraft during the steep approach phase of flight of the aircraft.

In some embodiments, the instructions are configured to cause the one or more data processors to inhibit a supply of pressurized air extracted from the engine to a heating system for the cargo compartment of the aircraft during the steep approach phase of flight of the aircraft.

Embodiments can include combinations of the above features.

In another aspect, the disclosure describes an aircraft comprising the system as disclosed herein.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

This disclosure relates to systems and methods for facilitating a steep final approach phase of flight of an aircraft. In various embodiments, the systems and methods disclosed herein can facilitate the use of a lower idle speed setting for one or more engines of the aircraft during a steep approach procedure of the aircraft compared to a normal (i.e., non-steep) approach at a classic approach angle. In various embodiments, the systems and methods disclosed herein can also facilitate the use of an ice protection system during the steep approach procedure.

A classic approach angle (i.e., glide slope) for a final approach of a fixed-wing aircraft is typically about 3 degrees from horizontal. The ability for some aircraft to execute final approaches at steeper approach angles can depend on the capabilities of such aircraft. In some situations, a steep approach angle can be considered to be greater than 3 degrees from horizontal. In some situations, a steep approach angle can be considered to be equal to or greater than about 4.5 degrees from horizontal. In some situations, a steep approach angle can be considered to be between about 4.5 degrees and about 5.5 degrees from horizontal. In some situations, a steep approach angle can be considered to be between about 4.5 degrees and about 7 degrees from horizontal.

A steep final approach can require the aircraft to have a relatively high rate of descent in order to achieve the required approach angle and follow the steeper glide slope. The higher rate of descent can be governed at least partially by thrust, drag and weight of the aircraft. For example, a lower thrust produced by one or more engines of the aircraft can facilitate a higher rate of descent for the aircraft. However, lowering a thrust output of an engine during a steep approach can be accompanied by an increase in time required for a subsequent acceleration of the engine in case of a go-around procedure being requested where the landing is aborted. Therefore, the thrust output or operating speed of the engine(s) during the steep approach must provide the ability for the engine(s) to be accelerated in a short enough time to perform the go-around procedure if needed. There can be a balance to be maintained to achieve a thrust output that is sufficiently low to facilitate a steep approach angle while simultaneously meeting acceleration requirements for a go-around procedure.

Aspects of various embodiments are described through reference to the drawings.

Figure 1:
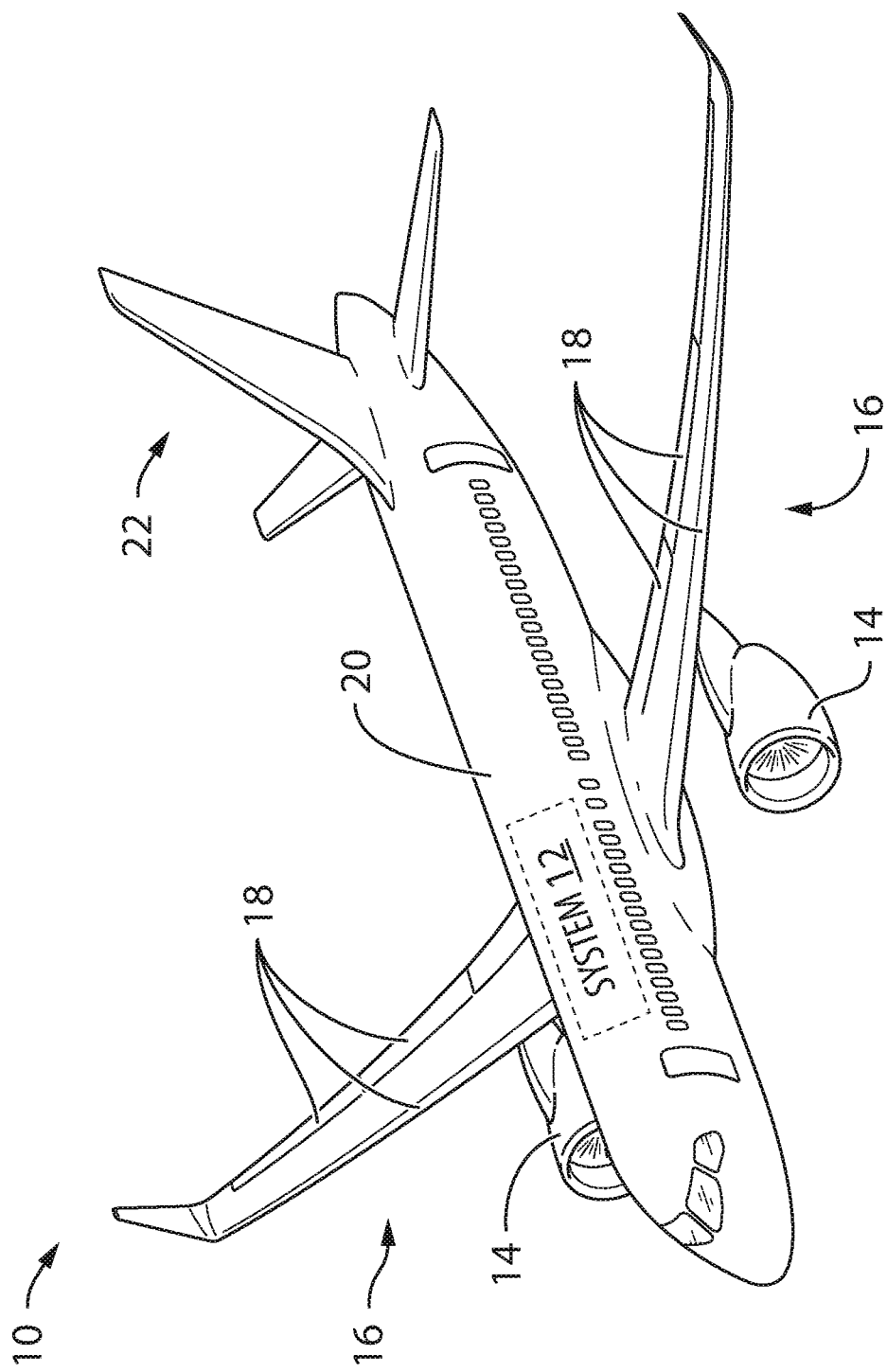
FIG. 1 is a perspective view of an exemplary aircraft comprising a system for controlling one or more aspects of the aircraft during a steep approach phase of flight.

FIG. 1 is a perspective view of an exemplary aircraft 10 which can comprise system 12 (shown schematically) for controlling one or more thrust-generating engines 14 and other aspects of operation of aircraft 10 during a steep approach phase of flight of aircraft 10. Aircraft 10 can be any suitable type of aircraft such as corporate (e.g., business jet), private, commercial and passenger aircraft. For example, aircraft 10 can be a narrow-body, twin-engine jet airliner. Aircraft 10 can be a fixed-wing aircraft. Aircraft 10 can comprise one or more wings 16 including one or more flight control surfaces 18, fuselage 20, one or more engines 14 and empennage 22. One or more of engines 14 can be mounted to one or more of wings 16. Alternatively, or in addition, one or more of engines 14 can be mounted to fuselage 20 or be installed on aircraft 10 in any suitable manner. In some embodiments, one or more engines 14 can be mounted to a tail of aircraft 10.

It is understood that system 12 or part(s) thereof can be located onboard aircraft 10 and/or remotely from aircraft 10 (e.g., at a ground station) where some aspect(s) of operation of aircraft 10 can be controlled remotely. Similarly, it is understood that the methods disclosed herein or part(s) thereof could be executed onboard aircraft 10 and/or remotely from aircraft 10 in case of aircraft 10 being controlled remotely. For example, it is understood that relevant information could be transmitted to/from aircraft 10 in order to achieve control of aircraft 10 as disclosed herein.

Figure 2:
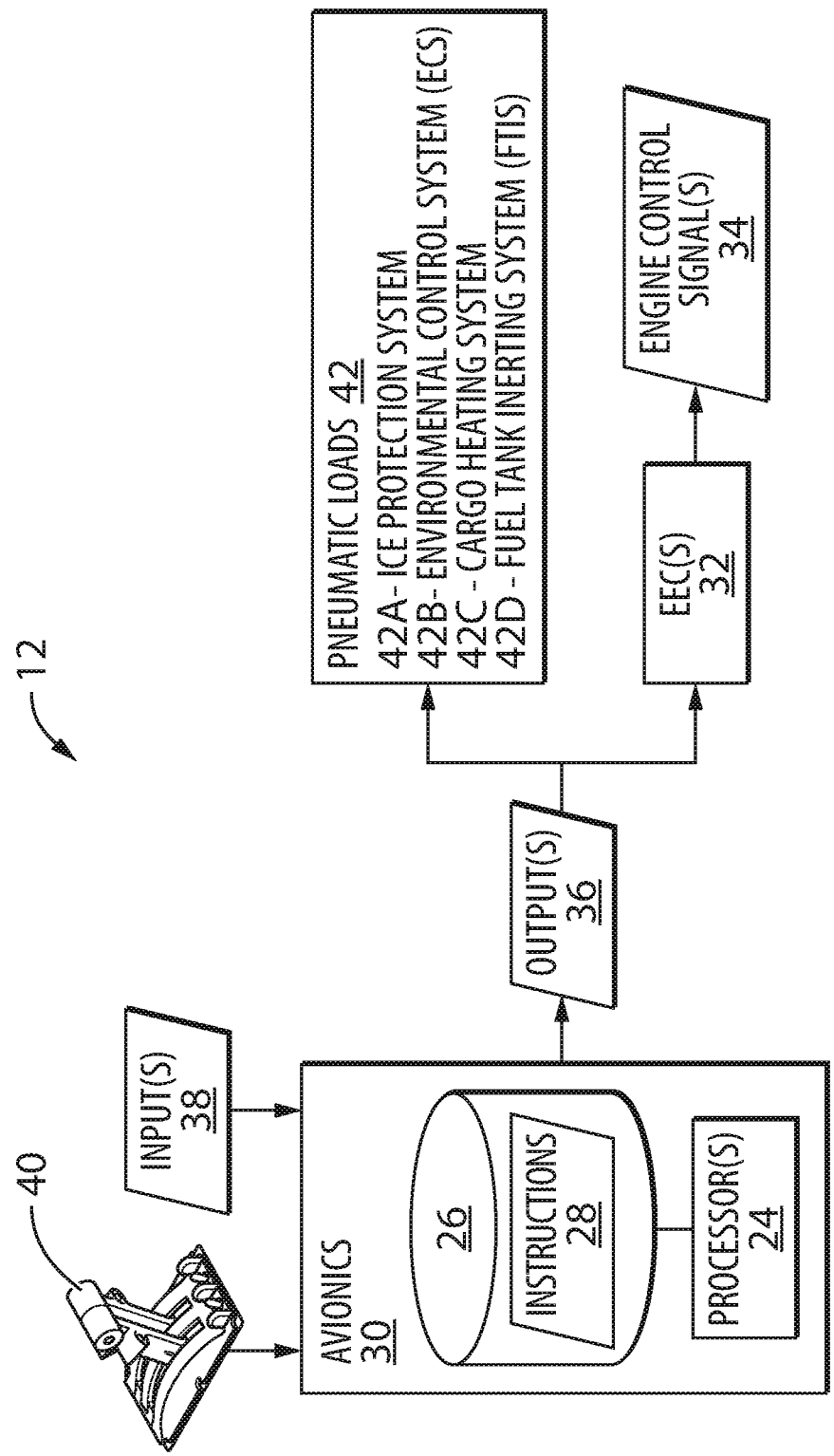
FIG. 2 is a more detailed schematic representation of the system in FIG. 1.

FIG. 2 is a schematic illustration of system 12 for controlling one or more aspects of operation of aircraft 10 during a steep approach phase of flight of aircraft 10. In some embodiments, system 12 can comprise one or more computers configured to perform the methods disclosed herein. The embodiment of system 12 illustrated in FIG. 2 is intended to be non-limiting as it is understood that aspects of this disclosure could be implemented on a system having a different architecture than that illustrated herein.

System 12 can comprise one or more data processors 24 (referred hereinafter in the singular) and one or more machine-readable memory(ies) such as non-transitory storage medium/media (referred hereinafter as "memory 26")

including machine-readable instructions 28 executable by processor 24. As explained below, instructions 28 can be configured to cause processor 24 to, in response to a signal indicative of a steep approach to be executed by aircraft 10, command one or more engines 14 of aircraft 10 to operate at a steep approach idle speed that is lower than a non-steep approach idle speed. The lower idle speed setting for the steep approach procedure can be configured to cause engine(s) 14 to have a lower thrust output than the higher idle speed setting for a non-steep approach procedure, in order to facilitate the steeper approach angle of aircraft 10.

System 12 can facilitate the execution of a steep approach procedure by aircraft 10. It is understood that the steep approach procedure executed by aircraft 10 can be fully or partially automated. In various embodiments, depending on the configuration of aircraft 10, the steep approach procedure can be executed by aircraft 10 with significant pilot input, or, can be executed substantially automatically to alleviate pilot workload while the pilot(s) perform(s) a supervisory role and is/are ready to take over control of aircraft 10 to, for example, abort landing if required.

Processor 24 can be part of aircraft avionics 30 and can comprise or can be part of any suitable computer, programmable data processing apparatus, logic circuit or other devices to cause a series of operational steps to be performed to produce a computer implemented process based on instructions 28. Aspects of the present disclosure can be embodied as an apparatus, method or computer program product. Accordingly, aspects of the present disclosure can take the form of an entirely hardware embodiment, an entirely software embodiment or an embodiment combining software and hardware aspects. Furthermore, aspects of the present disclosure can take the form of a computer program product embodied in memory 26 having computer readable program code (e.g., machine-readable instructions 28) embodied therewith.

Any combination of one or more known or other storage media can be utilized for storing instructions 28 thereon. Instructions 28 can comprise computer-readable program code for carrying out operations for aspects of the present disclosure and can be written in any combination of one or more programming languages. Instructions 28 can execute entirely or in part by processor 24. For example, in some embodiments, some or all of instructions 28 could be executed by one or more electronic engine controllers (EECs) 32 associated with respective engines 14. In some embodiments, some of instructions 28 could be executed by an air management system of aircraft 10 associated with one or more pneumatic loads on engine(s) 14.

Each EEC 32 can comprise one or more digital computers, data processors, microcontrollers or other suitably programmed or programmable logic circuits. In some embodiments, EEC 32 can be part of a Full Authority Digital Engine Control (FADEC) of engine 14. Each engine 14 of aircraft 10 can comprise its own EEC 32. EEC 32 and related accessories can control at least some aspect(s) of performance of engine 14. EEC 32 can, for example, be configured to make decisions regarding the control of engine 14 and can be configured to provide optimum engine efficiency for a given flight condition. EEC 32 can receive one or more inputs and, based on the inputs, generate one or more signals 34 useful in controlling some aspect(s) of the operation of engine 14. For example, such inputs can include measured/sensed (e.g., environmental and operational) parameters associated with engine 14 and/or with other part(s) of aircraft 10. EEC 32 can be operatively connected for data communication with aircraft avionics 30. For example, EEC 32 can be configured to receive parameters and/or instructions in the form of output 36 from aircraft avionics 30. EEC 32 can also transmit parameters and/or instructions to aircraft avionics 30. For example, each EEC 32 can receive a signal indicative of a type of approach to be executed by aircraft 10 and control a respective engine 14 accordingly. For example, each EEC 32 can control a fuel flow to a respective engine 14 to achieve a commanded idle speed setting.

System 12 can comprise one or more computers such as a flight management system (FMS) and a flight control computer (FCC) which can be part of an avionics suite of aircraft 10 and which can be configured to carry out additional functions than those described herein. Avionics 30 can receive one or more inputs 38 in the form of data that can be processed by data processor 24 based on instructions 28 in order to generate one or more outputs 36. For example, input 38 can comprise data indicative of a type of approach procedure selected by a pilot of aircraft 10 and that is to be executed by aircraft 10. For example, an approach procedure can comprise an Instrument Approach Procedure (IAP) of suitable type and can comprise a series of predetermined maneuvers for the orderly transfer of aircraft 10 under instrument flight conditions from the beginning of the initial approach to a landing, or to a point from which a landing can be made visually. The approach procedure can be prescribed and approved for a specific destination airport for aircraft 10 by a competent authority.

Input 38 can be received via one or more input devices of suitable types which can be part of the flight deck of aircraft 10. Alternatively, relevant data for performing the methods disclosed herein could be produced/derived within avionics 30. For example, in some embodiments, the type of approach can be selected by the pilot or can be automatically determined by avionics 30 based on the location of aircraft 10 as determined by global positioning system (GPS) for example or based on other factors, such as the flight plan, an airport at which the aircraft 10 is intended to land, or a runway on which aircraft 10 is intended to land. In some embodiments, the type of approach can be selected based on a glide slope angle value associated with the runway on which aircraft 10 is intended to land. In some embodiments, the type of approach can be selected based on information stored in the FMS for example. Once the type of approach has been selected, the appropriate approach procedure to be executed by aircraft 10 can be initiated at the appropriate time or altitude either automatically or with pilot input.

Avionics 30 can be operatively connected to receive input from a throttle lever 40 that is part of the flight deck of aircraft 10 for example. The position indicated by throttle lever 40 can be indicative of a desired thrust rating to be adopted by one or more engines 14. For example, throttle lever 40 can be used to command a maximum take-off (MTO) thrust setting or an idle speed setting for example. The MTO thrust setting can be intended for take-off of aircraft 10 or during a go-around procedure. The idle speed setting can be a common (i.e., universal) idle position of throttle lever 40 that is used to indicate a minimum idle speed setting, a steep approach idle speed setting or a non-steep approach idle speed setting where the applicable idle setting is automatically selected by system 12 based on a determined configuration or phase of operation of aircraft 10.

Output 36 can comprise one or more signals indicative of an approach type to be executed by aircraft 10 for the purpose of instructing EEC 32 accordingly. In some embodiments, output 36 can be representative of a desired idle speed setting to be executed by engine 14 based on a selected approach type and/or a position of throttle lever 40. EEC 32 can be configured to control engine 14 to execute different idle speed settings based on instructions from avionics 30 and based on one or more environmental or operational parameters. For example, EEC 32 can have access to suitable control data or schedules (e.g., look-up tables) useful for controlling engine 14 based on output 36.

Output 36 can comprise one or more signals for controlling one or more (e.g., pneumatic) loads on engines 14. For example, as explained below, a reduction in idle speed of engine 14 can be facilitated by the removal or reduction of loads on engine 14. Accordingly, output 36 can be configured to command a reduction of an overall pneumatic load on engine 14 in order to facilitate a lower idle speed and an adequate acceleration of engine 14 in the event of a go-around procedure. In various embodiments, pneumatic loads 42 can include ice protection system 42A, environmental control system (ECS) 42B, cargo heating system 42C and fuel tank inerting system (FTIS) 42D for example. In some embodiments, avionics 30 can include an integrated air system controller, which can be part of an air management system and configured to control pneumatic load(s) 42.

Ice protection system 42A can be configured to remove an accumulation of ice (i.e., de-icing), or, to prevent such accumulation of ice in the first place (i.e., anti-icing) on part(s) of aircraft 10 such as leading edges of wings 16 and/or inlet lips of nacelles of engine 14. In various embodiments, ice protection system 42A can comprise pneumatic de-icing boots that rely on pressurized (i.e., bleed) air extracted from engine 14 or can comprise a bleed air anti-icing system that keeps some surfaces of aircraft 10 above a freezing temperature. In some situations, a portion of ice protection system 42A associated with a leading edge of a left wing 16 and/or an inlet lip of a left engine 14 can be supplied with pressurized air extracted from a left engine 14 of aircraft 10. Similarly, a portion of ice protection system 42A associated with a leading edge of a right wing 16 and/or an inlet lip of a right engine 14 can be supplied with pressurized air extracted from a right engine 14 of aircraft 10. Alternatively, in case of an anomaly for example, one of engines 14 could supply portions of ice protection system 42A associated with both sides of aircraft 10 (i.e., single-source).

ECS 42B can be configured to provide air supply, thermal control and cabin pressurization for the flight crew and passengers of aircraft 10. ECS 42B can be operable in a lower-flow mode of operation or a higher-flow mode of operation. The lower-flow mode of operation can be associated with maintaining adequate ventilation of the cabin of aircraft 10 based on the size of the cabin and/or the number of passengers in the cabin after the desired temperature inside the cabin has been reached. The higher-flow mode of operation can be associated with executing a temperature change in the cabin such as heating or cooling the cabin of aircraft 10 following a period of non-use of aircraft 10 or following a change in environmental conditions outside of aircraft 10 for example. The higher-flow mode of operation can also be used for the evacuation of smoke from the cabin of aircraft 10.

Cargo heating system 42C can be configured to make use of pressurized (and heated) air extracted from engine 14 to provide heat to a cargo compartment of aircraft 10. FTIS 42D can be configured to make use of pressurized air extracted from engine 14 for decreasing the probability of combustion of fuel stored in fuel tank(s) of aircraft 10 by injecting nitrogen (from the pressurized air) in the fuel tank(s) of aircraft 10 in order to reduce the oxygen concentration inside the fuel tank(s).

Figure 3:
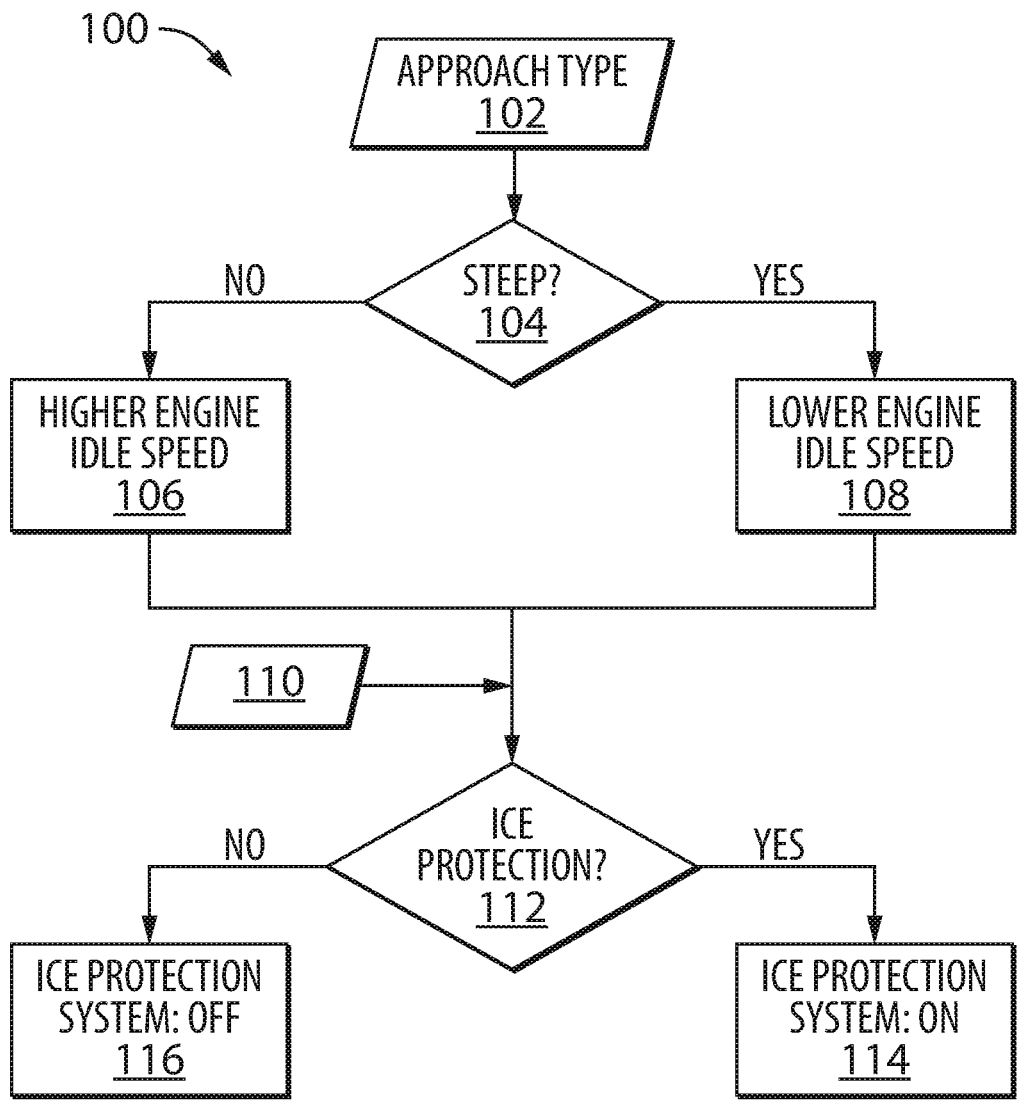
FIG. 3 is a flowchart illustrating a method for controlling one or more aspects of the aircraft of FIG. 1.

FIG. 3 is a flowchart illustrating a method 100 for operating aircraft 10 during a steep approach phase of flight. Method 100 can be carried out using system 12 disclosed herein or using another suitable system. Aspects of system 12 disclosed herein are therefore applicable to method 100. In various embodiments, method 100 can comprise receiving signal 102 indicative of an approach type to be executed by aircraft 10 and then commanding the appropriate idle speed to be adopted by engine 14 based on the approach type. For example, aircraft 10 can be capable of executing non-steep approaches (e.g., approach angle of about 3 degrees) and also steep approaches (e.g., approach angle equal to or greater than about 4.5 degrees). At block 104, method 100 can determine whether the approach type to be conducted is steep or non-steep. If the approach type is a classic non-steep (e.g., an approach angle of about 3 degrees), engine 14 can be commanded to operate at a higher idle speed (see block 106) during the approach phase of flight. Alternatively, if the approach type is steeper than a classic angle (e.g., an approach angle equal to or greater than about 4.5 degrees), engine 14 can be commanded to operate at a lower idle speed during the approach phase of flight (see block 108). Even though engine 14 is referred in the singular in reference to method 100, it is understood that in case of aircraft 10 comprising a plurality of thrust-producing engines 14, method 100 or part(s) thereof can be applied to one or more (e.g., all) of the plurality of engines 14 of aircraft 10.

Method 100 can also comprise receiving signal 110 indicative of whether icing protection is required for aircraft 10. Signal 110 can be indicative of one or more environmental conditions that can be used to determine if icing protection is required. Alternatively, signal 110 can be indicative of a pilot requesting the activation or deactivation of ice protection system 42A. At block 112, method 100 can determine whether ice protection is required based on signal 110. If ice protection is required, ice protection system 42A can be operated during the steep or non-steep approach procedure (see block 114). If ice protection is not required, ice protection system 42A can be deactivated (see block 116).

In reference to the embodiment of system 12 illustrated in FIG. 2, signals 102 and 110 can be received by avionics 30 in the form of input 38 and avionics 30 can issue one or more commands in the form of output 36 for operating engine 14 at the appropriate idle speed via EEC 32 and also for operating ice protection system 42A if required. Alternatively, signal 102 indicative of the approach type can be provided via avionics 30 in the form of output 36 to EEC 32 so that EEC 32 can select the appropriate idle speed for controlling engine 14.

Figure 4:
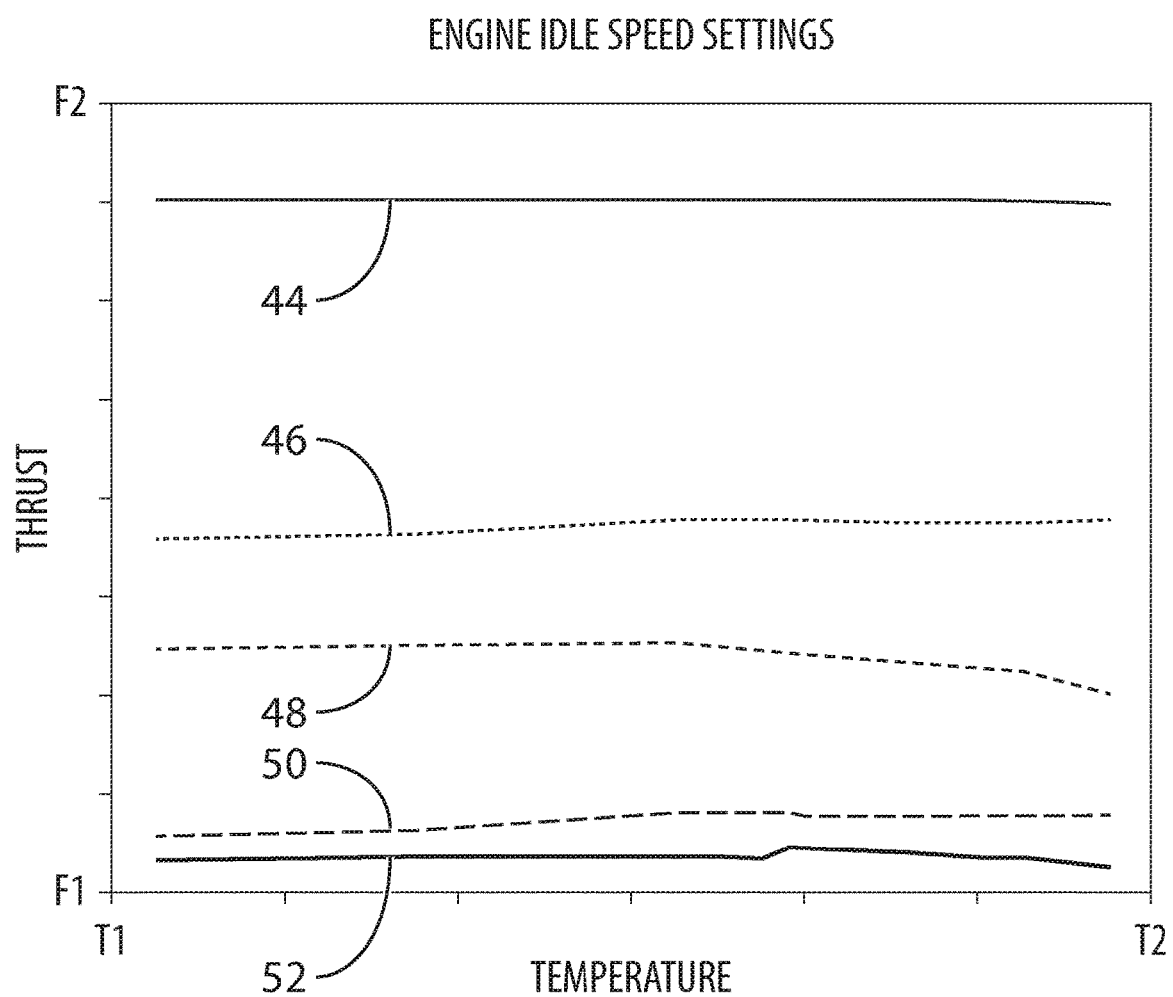
FIG. 4 is a graph illustrating relative thrust output levels of a plurality of idle settings associated with one or more engines of the aircraft of FIG. 1.

FIG. 4 is a graph illustrating thrust output levels of a plurality of exemplary idle speed settings associated with one or more engines 14 of aircraft 10. The y-axis (ordinate) in the plot of FIG. 4 represents a thrust force ranging between the values of F1 and F2. The x-axis (abscissa) in the plot of FIG. 4 represents an ambient temperature ranging between the values of T1 and T2 in which aircraft 10 is operating. Plot 44 represents a non-steep approach idle setting where pneumatic loads 42 on engine(s) 14 are active or inactive. Plot 46 represents a steep approach idle setting where pneumatic loads 42 on engine(s) 14 are active. Plot 48 represents a steep approach idle setting where pneumatic loads 42 on engine(s) 14 are inactive. Plot 50 represents a minimum idle setting where pneumatic loads 42 on engine(s) 12 are active. Plot 52 represents a minimum idle setting where pneumatic loads 42 on engine(s) 12 are inactive. The minimum idle setting is the minimum thrust setting that can be used while aircraft 10 is in flight and can be used during an initial descent phase of flight of aircraft 10 when the time to accelerate engine(s) 14 can be longer than during a final approach since aircraft 10 is at a higher altitude. The minimal idle setting can also be used when aircraft 10 is on the ground (e.g., ground idle).

The non-steep approach idle setting (e.g., plot 44) is usually defined so that it is applicable for a wide range of operating conditions for aircraft 10. For example, the non-steep approach idle setting can be selected to be relatively conservative (i.e., higher) in order to achieve the required acceleration requirements at airports of different elevations and also in a wide range of operating temperatures. Accordingly, the non-steep approach idle setting represented by plot 44 can be common for many or all non-steep approach procedures that can be executed by aircraft 10.

The steep approach idle setting(s) (e.g., plots 46 and 48) on the other hand can be tailored for specific airports and associated environmental and operational conditions in which a steep approach procedure is to be executed. It is understood that an engine idle setting does not necessarily represent a constant speed value but can instead be a value that varies based on environmental conditions such as temperature as illustrated in FIG. 4 and also based on ambient air density since the performance of engine 14 can vary as a function of environmental conditions. For example, even though, throttle lever 40 can be set to indicate a generic idle setting, the actual idle speed at which engine 14 is operated can vary based on one or more parameters such as ambient temperature and/or altitude. The determination of the actual operating speed of engine 14 can be made by EEC 32 in some embodiments. In the case of engine 14 being a dual-spool turbofan engine, a parameter relied upon by EEC 32 for maintaining the appropriate idle speed can be a shaft speed such as a rotational speed (N1) of a low-pressure spool or a rotational speed (N2) of a high-pressure spool of engine 14. It is understood that one or more other parameters such as an engine pressure ratio or a minimum bleed pressure could instead be used to control the idle speed/thrust setting of engine 14. In some embodiments, the steep approach idle speed setting can be selected to achieve an adequate thrust (e.g., to about 80% of MTO thrust) in about 8 seconds to meet go-around climb gradient requirements in the event of a go-around procedure being initiated during a steep approach procedure.

For example, in keeping everything else constant, an approach idle setting tailored for an airport (e.g., London City Airport (LCY)) located at a lower elevation in relation to sea level (e.g., higher air density) could be lower than an approach idle setting tailored for an airport located at a higher elevation in relation to sea level for a same acceleration time to MTO thrust. Therefore in order to obtain a lower idle speed during a steep approach, the idle setting used for steep approach can be tailored more specifically to the particular airport(s) at which the steep approach procedure will be used instead of being universally applicable to all airports. For example, the lower idle speed for a steep approach can be tailored to be applicable for a narrower range of (e.g., environmental and operational) conditions than the more widely applicable non-steep approach idle speed setting. Operational conditions such as an overall pneumatic load on engine 14 can also affect the steep approach idle setting.

Figure 5:
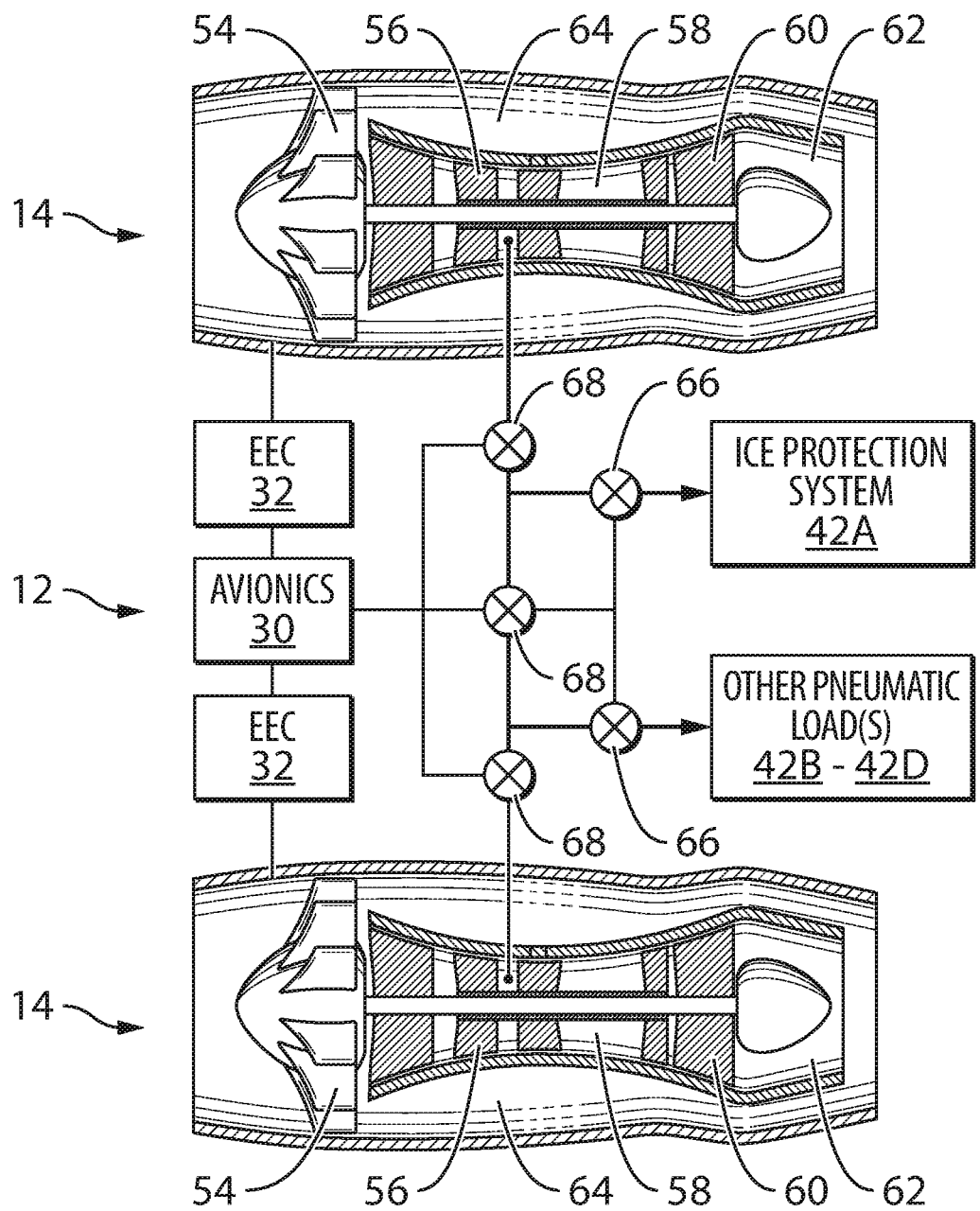
FIG. 5 is a schematic representation of two engines of the aircraft of FIG. 1 together with associated pneumatic loads.

FIG. 5 is a schematic representation of system 12 in combination with two engines 14 of aircraft 10 and associated pneumatic loads 42 on engines 14. In some embodiments, each engine 14 can be a dual spool turbofan gas turbine engine. Engines 14 can each comprise fan 54 through which ambient air is propelled, compressor section 56 in which the air is compressed, combustor 58 in which the compressed air is mixed with fuel and ignited to generate a stream of hot combustion gas, and turbine section 60 in which energy is extracted from the stream of hot combustion gas. Compressor section 56, combustor 58 and turbine section 60 can be disposed in core 62 of engines 14. Each engine 14 can also comprise bypass duct 64 surrounding engine core 62.

Pneumatic loads 42 can be selectively operatively connected to receive pressurized (i.e., bleed) air extracted from a compressor section 56 of one or both of engines 14. Such connections can be made via valves 66 and 68, which can be controlled via avionics 30 or via EEC 32 in various embodiments for example. It is understood that each other pneumatic load 42B-42D grouped together in FIG. 5 for the sake of clarity can be operatively connected to one or both engines 14 via respective valves 66. Valves 66 can serve to control the flow of pressurized air to individual pneumatic loads 42 and valves 68 can serve to select from which engine 14 the pressurized air is supplied. The use of valves 66 and 68 is used herein to illustrate the ability to manage the overall pneumatic load on one or more engines 14. It is understood that the architecture shown in FIG. 5 is simplified to illustrate functionality for the sake of clarity and that other architectures are possible.

In order to permit a lower idle speed of engines 14 during a steep approach procedure, pneumatic loads 42 or other loads connected to engines 14 can be managed (e.g., via valves 66) to facilitate a low enough idle speed while also facilitating acceptable acceleration performance of engines 14 to MTO or go-around thrust in the event of a go-around procedure for example. For example, in the event of a steep approach procedure, it can be desirable to operate engines 14 with a reduced overall pneumatic load. In some embodiments, it can be desirable to supply one or more pneumatic loads 42 from both engines 14 (e.g., by having both valves 68 open) in order to distribute the overall pneumatic load substantially equally between engines 14 (i.e., dual source). In some embodiments, the availability and proper operation of both engines 14 can be a pre-requisite to permitting aircraft 10 to execute a steep approach procedure.

In some embodiments, after receiving an indication that a steep approach is to be executed by aircraft 10, an overall pneumatic load on engines 14 can be reduced by reducing the amount of pressurized air being delivered to one or more pneumatic loads 42 so that the steep approach procedure can be executed with a reduced overall pneumatic load compared to other phases of flight or to a non-steep approach procedure. In some embodiments, the flow of pressurized air to one or more non-essential pneumatic loads 42 can be temporarily reduced or inhibited via applicable valves 66 depending on the nature of such pneumatic loads 42. In some embodiments, a maximum limit on the overall pneumatic load can be imposed during the steep approach procedure and the supply of pressurized air to individual pneumatic loads 42 can be managed and allocated accordingly. In some embodiments, a total amount of pressurized air extracted from each engine 14 can be limited to a maximum proportion (e.g., about 10%, 12% or 20%) of a total flow through core 62 of engine 14 during the steep approach procedure when engine 14 is operating at the steep approach idle setting.

In the event of ice protection being required on aircraft 10 during the steep approach procedure due to environmental conditions susceptible to causing icing, the overall pneumatic load on engines 14 can be managed to permit the operation of ice protection system 42A while also permitting a suitably low idle setting. For example, in the event of ice protection being required during a steep approach procedure, an amount of pressurized air being supplied from engines 14 to one or more other pneumatic loads 42B-42D can be reduced while some pressurized air extracted from engines 14 is supplied to ice protection system 42A.

Since the final approach phase of flight can be of relatively short duration, it can be acceptable in some situations to temporarily reduce or interrupt the flow of pressurized air to some pneumatic loads 42 during the steep approach procedure with minimal consequences. Accordingly, the allocation of pressurized air can be adjusted to provide adequate ice protection during the steep approach procedure if required. In case of ECS 42B being operable in a lower-flow (e.g., ventilation) mode of operation or in a higher-flow mode of operation for example, system 12 can be configured to inhibit an operation of ECS 42B in the higher-flow mode of operation during the steep approach procedure. In the case of cargo heating system 42C for example, system 12 can be configured to reduce or inhibit a supply of pressurized air extracted from engines 14 to cargo heating system 42C during the steep approach procedure. In the case of fuel tank inerting system 42D of aircraft 10 for example, system 12 can be configured to reduced or inhibit a supply of pressurized air extracted from engines 14 to fuel tank inerting system 42D during the steep approach procedure.

In some embodiments where aircraft 10 comprises two or more thrust-producing engines 14, ice protection system 42A can be supplied with pressurized air extracted from both (e.g., or all thrust-producing) engines 14 of aircraft 10 (e.g., dual source) so that the pneumatic load associated with ice protection system 42A can be shared between two or all thrust-producing engines 14 of aircraft 10. In some embodiments, system 12 can be configured to inhibit an operation of ice protection system 42A where the pressurized air is supplied to ice protection system 42A from only one of the two engines 14 (i.e., single source) during the steep approach phase of flight of the aircraft since the single source operation of ice protection system 42A may not be compatible with the use of the lower idle speed setting associated with the steep approach procedure in some embodiments.

In some embodiments, instead of inhibiting specific configurations of pneumatic loads 42 on one or more of engines 14 during the use of the lower idle speed for the steep approach procedure, the use of the lower idle speed and hence the steep approach procedure could be inhibited or discontinued in case of a condition (e.g., anomaly) that requires a configuration of pneumatic loads 42 that is not compatible with the lower idle speed. For example, in the event of an anomaly that would cause ice protection system 42A to be supplied with pressurized air extracted from one engine 14 (i.e., single source) instead of from both engines 14 (i.e., dual source), system 12 could be configured to cause the use of the lower idle speed to be inhibited or discontinued and consequently the steep approach procedure to also be inhibited or discontinued. In such event, the pilot(s) of aircraft 10 may be required to cause aircraft 10 to execute a normal (i.e., non-steep) approach procedure instead of a steep approach procedure.

The above description is meant to be exemplary only, and one skilled in the relevant arts will recognize that changes may be made to the embodiments described without departing from the scope of the invention disclosed. The present disclosure can be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method for operating an aircraft during a final approach phase of flight of the aircraft, the method comprising:
   receiving a signal indicative of an approach type to be executed by the aircraft;
   when the approach type to be executed by the aircraft is a steep final approach:
      after receiving the signal indicative of the approach type to be executed by the aircraft, reducing an amount of pressurized air being supplied from an engine of the aircraft to one or more pneumatic loads other than an ice protection system of the aircraft;
      operating the engine at a first idle speed during the steep final approach; and
      operating the ice protection system during the steep final approach by supplying pressurized air extracted from the engine to the ice protection system of the aircraft;
   when the approach type to be executed by the aircraft is a non-steep final approach, operating the engine of the aircraft at a second idle speed during the non-steep final approach,
   wherein:
      the steep final approach is steeper than the non-steep final approach;
      the first idle speed of the engine used during the steep final approach is lower than the second idle speed of the engine used during the non-steep final approach;
      the one or more pneumatic loads other than the ice protection system include an environmental control system of the aircraft that is operable in a lower-flow mode of operation and in a higher-flow mode of operation; and
      the method comprises inhibiting an operation of the environmental control system in the higher-flow mode of operation during the steep final approach.

2. The method as defined in claim 1, wherein the aircraft comprises at least two engines and the pressurized air supplied to the ice protection system during the steep final approach is supplied from all engines.

3. The method as defined in claim 2, further comprising inhibiting the operation of the engine of the aircraft at the first idle speed in case of a condition causing the pressurized air to be supplied to the ice protection system from fewer than the at least two engines.

4. The method as defined in claim 1, wherein the aircraft comprises at least two engines and the method comprises inhibiting an operation of the ice protection system where pressurized air is supplied to the ice protection system from only one of the at least two engines during the steep final approach.

5. The method as defined in claim 1, comprising inhibiting a supply of pressurized air extracted from the engine to a fuel tank inerting system of the aircraft during the steep final approach.

6. The method as defined in claim 1, comprising inhibiting a supply of pressurized air extracted from the engine to a heating system for a cargo compartment of the aircraft during the steep final approach.

7. The method as defined in claim 1, wherein an angle of approach associated with the steep final approach is equal to or greater than 4.5 degrees from horizontal.

8. A system for operating an aircraft during a final approach phase of flight of the aircraft, the system comprising:
   one or more data processors; and
   non-transitory machine-readable memory storing instructions executable by the one or more data processors and configured to cause the one or more data processors to:
      receive a signal indicative of an approach type to be executed by the aircraft;
      when the approach type to be executed by the aircraft is a steep final approach:
         command an engine of the aircraft to operate at a first idle speed during the steep final approach; and
         command an ice protection system of the aircraft to operate during the steep final approach; and
      when the approach type to be executed by the aircraft is a non-steep final approach, command the engine of the aircraft to operate at a second idle speed during the non-steep final approach, the steep final approach being steeper than the non-steep final approach, and the first idle speed of the engine used during the steep final approach being lower than the second idle speed of the engine used during the non-steep final approach,
   wherein:
      the instructions are configured to cause the one or more data processors to command a supply of pressurized air extracted from the engine to the ice protection system of the aircraft during the steep final approach;
      the instructions are configured to, after receiving the signal indicative of the approach type to be executed by the aircraft when the approach type is the steep final approach, cause the one or more data processors to command a reduction in an amount of pressurized air being supplied from the engine to one or more pneumatic loads other than the ice protection system;
      the one or more pneumatic loads include an environmental control system of the aircraft that is operable in a lower-flow mode of operation and a higher-flow mode of operation; and
      the instructions are configured to cause the one or more data processors to command an inhibition of an operation of the environmental control system in the higher-flow mode of operation during the steep final approach.

9. The system as defined in claim 8, wherein the instructions are configured to cause the one or more data processors to command the supply of pressurized air to the ice protection system from at least two engines of the aircraft during the steep final approach.

10. The system as defined in claim 9, wherein the instructions are configured to cause the one or more data processors to command an inhibition of the operation of the engine of the aircraft at the first idle speed in case of a condition causing the pressurized air to be supplied to the ice protection system from fewer than the at least two engines.

11. The system as defined in claim 8, wherein the instructions are configured to cause the one or more data processors to inhibit an operation of the ice protection system where pressurized air is supplied to the ice protection system from only one of at least two engines of the aircraft during the steep final approach.

12. The system as defined in claim 8, wherein the instructions are configured to cause the one or more data processors to inhibit a supply of pressurized air extracted from the engine to a fuel tank inerting system of the aircraft during the steep final approach.

13. The system as defined in claim 8, wherein the instructions are configured to cause the one or more data processors to inhibit a supply of pressurized air extracted from the engine to a heating system for a cargo compartment of the aircraft during the steep final approach.

14. An aircraft comprising the system as defined in claim 8.

* * * * *